Figure 1:
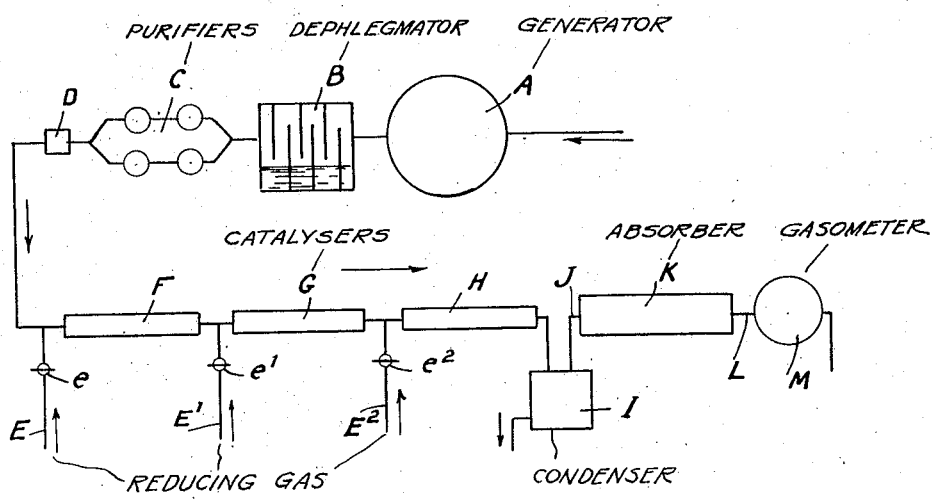

Patented May 7, 1929.

1,711,856

UNITED STATES PATENT OFFICE.

EUGÈNE ALBERT PRUDHOMME, OF NEUILLY-SUR-SEINE, FRANCE, ASSIGNOR TO SOCIÉTÉ INTERNATIONALE DES PROCEDES PRUDHOMME (S. I. P. P.), OF PARIS, FRANCE, A LIMITED JOINT-STOCK COMPANY OF FRANCE.

PROCESS FOR THE MANUFACTURE OF SYNTHETIC LIQUID FUELS.

Application filed April 7, 1926, Serial No. 100,464, and in France March 9, 1926.

In my previous application Serial No. 3,655 filed January 20, 1925, I have described a process and apparatus for the manufacture of synthetic liquid fuels, which comprise a particular cycle of operations by means of which solid combustibles or plastic or liquid hydrocarbonated combustibles of low value can be transformed into stable liquid fuels enriched with hydrogen, applicable particularly for driving internal combustion engines.

This cycle of operations, which is carried through at normal pressure, comprises, distillation of the starting materials (lignites, peats, tars or the like) in an apparatus wherein these materials suitably heated are traversed by a stream of hot gases or vapours (water gas, steam, residual gas from coking or the manufacture of industrial liquid fuels). On leaving the gasification apparatus, the distillation gases, enriched with hydrocarbons by the addition of the added gases or vapours, are purified, with a view to initial elimination of deleterious substances, in particular sulphur, the purifying bodies being, for example, catalytic agents such as metals or metallic oxides (nickel or nickel oxide), and then led, thus purified, over a bank of catalyzers arranged in series. Such catalysis in cascade ensures the formation, in consecutive steps, first of a very large proportion of methane ($CH_4$), with little acetylenic compounds, then the transformation of such methane, by splitting up into acetylene ($C_2H_2$) and free hydrogen in the nascent condition, and finally this large quantity of acetylenic compounds being formed, their polymerization occurs in a final catalyzer and gives rise to carbides to which the free hydrogen attaches itself, to effect their transformation into light hydrocarbons, condensible at a temperature varying between 180 and 220° C.

One of the essential characteristics of the above recited process is to be seen in the fact that throughout the entire operative cycle, from the issue of the gases from the kiln, the entire mass of such gases (comprising then a mixture of products of distillation of the substances treated and of residual or other additional gases, which served for their enrichment) until their issue from the last of the catalyzers in series, care is taken to maintain a temperature sufficiently elevated to avoid any condensation, and consequently, any formation of tars.

This precaution which it is easy to observe, for example by disposing the whole of the purifiers and series of catalyzers in one and the same heated structure, connected to the distillation kilns or retorts, has not simply the result of permitting a continuous operation, by avoiding choking and incrustation by products of condensation; it provides above all another advantage consisting in integrally conserving the gaseous mixture, in order to treat same progressively by the catalyzers in series; in particular the heavy hydrocarbons derived from the starting solid or other combustible material are maintained, which especially promotes the enrichment of such product, during the course of the catalysis.

In the successive catalyzers, these condensible substances pursue their rôle like non-condensible substances. In effect, in the first catalyzer of the series, there is produced a general hydrogenation, a deoxidation of bodies easy to hydrogenate in the state wherein such bodies leave the purifiers; thus if the carbonmonoxide (CO) of the noncondensible products gives rise to the production of methane ($CH_4$) at the same time, the condensible bodies such as the phenols ($C_6H_5OH$) lose their oxygen and pass in the state of benzines ($C_6H_6$). This preparatory stage is particularly necessary in order to ensure a deoxidation, but the definite enrichment cannot be immediately effected. Likewise it is convenient to take up again the incondensible products and the condensible products in order to enrich them anew. To effect this, they pass into the second catalyzer, wherein occurs a splitting-up of the bodies which, such as methane ($CH_4$) have just become saturated, or the saturated bodies of the same series present in the entrained tar vapours (decane, ondecane, dodecane, etc.), that is to say an opening of the chain which permits a new hydrogenation which will occur in the third catalyzer. The hydrogen nascent in the second catalyzer apparatus, does not proceed alone from the transformation of the methane and the acetylene, but also from the action which the remaining carbonmonoxide exercises upon the stream. In the third catalyzer of the series there is finally produced simultaneously with the polymerization, the saturation with hydrogen of all the condensible and noncondensible substances which, in anticipation of this operation, had been broken up in the preceding catalyzer.

As is seen, the catalysis, the saturation with hydrogen, according to the process above described, comprises, in an initial catalyzer element, an initial hydrogenation to the degree possible, by substitution of hydrogen for oxygen; this initial hydrogenation is followed, in a second catalyzer, by a breaking up of the initial saturated products, with a view to placing such products in a form facilitating the fixation of the nascent hydrogen which is produced at the same time with such breaking up. It only remains to bring the nascent hydrogen and the bodies on which it is to become fixed, into the presence of a third catalyzer agent which facilitates these reactions.

The applicant has, moreover, indicated how, in the plant itself which serves for the carrying out of his process, contaminated catalyzers can be regenerated in the dry condition, without it being necessary to discharge the tubes containing them, this being effected by the employment of streams of vapours of an organic acid, such as acetic acid, formic acid, lactic acid, which in effecting the removal of the sulphur in the form of $H_2S$, give rise to acetates, formates or lactates from which the metal can then be recovered, in situ, by a simple elevation of temperature effecting decomposition of these salts.

It is important to recall all these characteristics in order better to appreciate the interest and the importance of the improvements which form the subject of the present invention.

The applicant has recognized first of all that if it is convenient to retain the useful condensible substances, such as the tar vapours, in the gaseous mass (to be submitted, after passage through the purifiers, to the action of the catalyzers in series), for the reason that these substances singularly promote the richness of the light product which is obtained on issue from the said catalyzer, it is on the other hand preferable to eliminate those of these condensible products of high boiling point, which distil only at a temperature above 400° C. These very heavy substances are, for this purpose, and according to the present improvements, separated in a dephlegmator maintained at a temperature of about 400° C., disposed between the apparatus producing the gas (kiln, retort or the like) and the battery of purifiers which can contain metallic or oxymetallic catalytic agents and precedes the catalyzers in series. The gases to be lightened and enriched by catalysis enter the purifiers, disembarrassed of the heavy substances which distil above 400° C. only; however, they retain, in compensation, all the tar vapours which would condense below 400° C., the condensation in the purifiers and the catalyzers being then avoided by the maintenance by a suitable temperature in the whole of these apparatuses and intermediate pipes. This temperature to be maintained progressively decreases, not only because the mechanical entrainment of the condensible products avoids in part any condensation, but above all because the products progressively become lighter. Consequently, in the purifiers will be maintained a temperature which will not exceed 350° C., and, in the catalyzers, a temperature which will generally not pass above 250° C.

Figure 2:
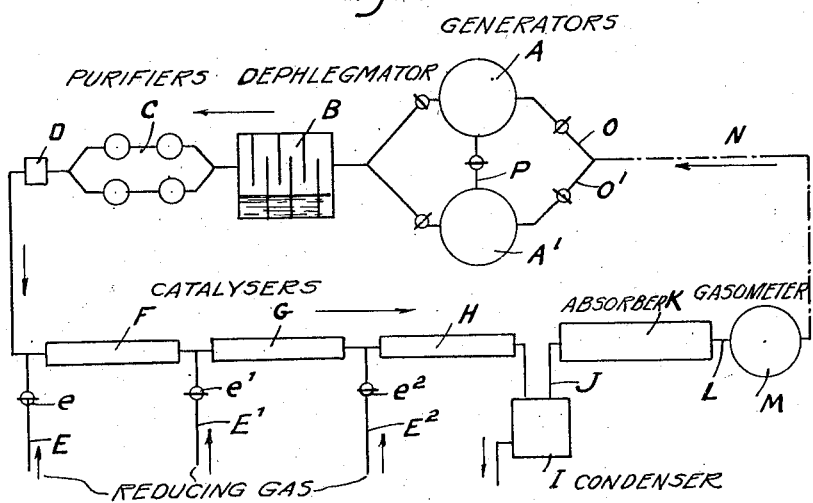

The drawings indicate diagrammatically in Figs. 1 and 2 two plants for carrying out the invention.

On leaving the dephlegmator B, as shown in the schematic view of the plant in Fig. 1 of the accompanying drawing, the products pass through a purifier C constituted according to the invention which forms the subject of an application for patent filed April 7, 1926, Serial No. 100,462, entitled "Process and apparatus for the hot desulphurization of gases derived from the distillation of the pyrogenation of solid liquid and other combustibles", by Eugene Albert Prudhomme.

In order to facilitate the circulation of the gases, the same are sucked on issue from the purifier, by means of a suitable exhausting apparatus (fan, ejector or the like) D which, like the remainder of the plant is maintained at a suitable temperature (about 300° C.), and this apparatus drives the gases into the catalyzers.

According to the present improvements, the plant comprises means for the introduction in variable proportions, as required, of fresh hydrogenating gases (water gas or the like) before the entry into the initial catalyzers, in order to maintain a sufficiently active reducing atmosphere, and as well between the successive catalyzers, for the production, in the desired quantity, of the nascent hydrogen. The gases derived from any source, which may be residual products (semi-cokes or the like), are admitted by pipes E, $E^1$, $E^2$, provided with cocks $e$, $e^1$, $e^2$.

Obviously the quantity of gas to be introduced will be determined by the analysis of of the final product or by tests effected as required during the course of manufacture.

The successive catalyzers of the series can be constituted, as has been indicated in a prior application for patent filed January 20, 1925, Serial No. 3,655, by various metals or metallic oxides, in the three elements of the series. For example, nickel may be employed in the first, a mixture of nickel and vanadium in the second, and a mixture of nickel and cobalt in the third element.

On issue from the last of the three catalyzers F, G, H, the lightened and enriched gases or vapours pass through a condenser I at the surrounding atmospheric temperature, where they abandon condensible vapours, the liquid condensed constituting the most important portion of the products of manufacture.

The noncondensed vapours are led, by J, into an absorption apparatus K containing for example activated carbon or solvent oil. The permanent gases issuing from the apparatus are led, by L, into a gasometer M; they may, as is well known, be utilized either for being reintroduced into the kiln or other distilling apparatus A, or for injection at E, $E^1$, $E^2$, or finally they may serve for heating the various elements of the plant.

The diagram of Fig. 2 shows the application of the above described improvements to a plant which comprises a return of the residual gases by a pipe N, to the apparatus which produces gas by distillation or pyrogenation. The latter comprises, in such case, two elements A and $A^1$ of which one $A^1$ is charged with coke derived from a preceding operation, and which is traversed by the residual gases arriving by N—$O^1$, before the gases are passed by P into the element A charged with fresh material.

When the material in the element A is exhausted, this element finds itself charged with coke, during which the coke in $A^1$ will have been evacuated for replacement by a fresh charge of material to be treated. The residual gases will then follow the path N—O—A—$A^1$.

Claims:

1. In a process for the manufacture of synthetic fuels which consists in vaporizing hydrocarbon products and passing said vaporized products through a series of successive catalyzers to a condenser, said catalyzers effecting in successive steps a general hydrogenation, a splitting up of the hydrogenated products into unsaturated products, and a saturation and polymerization of said unsaturated products, the step of adding to said vaporized products before entry into each catalyzer variably proportioned amounts of reducing gas.

2. A process for the manufacture of synthetic fuels which consists in subjecting hydrocarbon products vaporized within 400° C. to the action of a succession of catalytic elements effecting in successive stages a general hydrogenation, a splitting up of the hydrogenated products into unsaturated products, and a saturation and polymerization of said unsaturated products, adding to said products a separate quantity of reducing gas before treatment with each catalyzer, and condensing the resultant product.

3. A process for the manufacture of synthetic fuels which consists in vaporizing hydrocarbon products, passing said vaporized products through a dephlegmator maintained at 400° C. and through a purifying element maintained at 350° C., subjecting said products to the action of a plurality of catalyzers effecting in successive stages a general hydrogenation, a splitting up of the hydrogenated products into unsaturated hydrocarbons, and a saturation and polymerization of said unsaturated hydrocarbons, while maintaining a temperature of not more than 250° C. throughout said catalyzers, adding to said products a separate quantity of reducing gas in each catalyzer, and condensing the resultant product.

4. A process for the manufacture of synthetic fuel which consists in vaporizing hydrocarbon products, separating out the heavier fractions in a dephlegmator maintained at 400° C., passing the lighter fractions through a series of catalyzers effecting in successive stages a general hydrogenation, a splitting up of the hydrogenated products into unsaturated hydrocarbons, and a saturation and polymerization of said unsaturated hydrocarbons, and condensing the resultant products.

5. A process for the manufacture of synthetic fuel which consists in vaporizing hydrocarbon products, separating out the heavier fractions in a dephlegmator maintained at 400° C., passing the lighter fractions through a series of catalyzers effecting in successive stages a general hydrogenation, a splitting up of the hydrogenated products into unsaturated hydrocarbons, and a saturation and polymerization of said unsaturated hydrocarbons while adding to said lighter fractions a separate quantity of reducing gas before each catlyzer, and condensing the resultant products.

In testimony whereof I have signed this specification.

EUGÈNE ALBERT PRUDHOMME.